(12) United States Patent
Xiao et al.

(10) Patent No.: US 12,214,331 B2
(45) Date of Patent: Feb. 4, 2025

(54) PROCESSES FOR PREPARING FUNCTIONAL PARTICLES FOR USE IN ELECTROCHEMICAL CELLS AND ELECTROCHEMICAL CELLS INCLUDING SAID FUNCTIONAL PARTICLES

(71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 754 days.

(21) Appl. No.: 17/390,757

(22) Filed: Jul. 30, 2021

(65) Prior Publication Data
US 2023/0035392 A1 Feb. 2, 2023

(51) Int. Cl.
| | | |
|---|---|---|
| B01J 20/30 | (2006.01) | |
| B01J 20/18 | (2006.01) | |
| H01M 10/0525 | (2010.01) | |
| H01M 10/056 | (2010.01) | |
| H01M 50/403 | (2021.01) | |
| H01M 50/443 | (2021.01) | |
| H01M 50/449 | (2021.01) | |

(52) U.S. Cl.
CPC ......... *B01J 20/3042* (2013.01); *B01J 20/186* (2013.01); *H01M 10/0525* (2013.01); *H01M 50/403* (2021.01); *H01M 50/443* (2021.01); *H01M 50/449* (2021.01); *H01M 10/056* (2013.01)

(58) Field of Classification Search
CPC ..................................................... B01J 20/186
See application file for complete search history.

(56) References Cited

U.S. PATENT DOCUMENTS

| | | |
|---|---|---|
| 10,483,592 B2 | 11/2019 | Xiao et al. |
| 10,615,461 B2 | 4/2020 | Xiao et al. |
| 10,950,836 B2 | 3/2021 | Xiao et al. |

(Continued)

FOREIGN PATENT DOCUMENTS

| | | |
|---|---|---|
| CN | 103864091 A | 6/2014 |
| CN | 106025338 A | 10/2016 |

(Continued)

OTHER PUBLICATIONS

CN 106384841 A Translation from Espacenet (Year: 2017).*

(Continued)

*Primary Examiner* — Nathanael T Zemui
(74) *Attorney, Agent, or Firm* — Harness, Dickey & Pierce, P.L.C.

(57) ABSTRACT

Methods of making functional particles, such as functional lithium ion-exchanged zeolite particles and functional electrode particles for electrochemical cells are provided as well as electrochemical cells including such particles. A method includes combining a solution including $(NH_4)_3PO_4$ with lithium ion-exchanged zeolite particles to form a first mixture. The method further includes adding a polymeric binder and a lithium salt to the first mixture to form a first slurry including the functional lithium ion-exchanged zeolite particles comprising $Li_3PO_4$.

19 Claims, 6 Drawing Sheets

(56) References Cited

U.S. PATENT DOCUMENTS

| | | | |
|---|---|---|---|
| 11,557,758 | B2 | 1/2023 | Liu et al. |
| 11,936,066 | B2 | 3/2024 | Xiao et al. |
| 2018/0254449 | A1 | 9/2018 | Xiao et al. |
| 2018/0254531 | A1* | 9/2018 | Xiao ................ H01M 10/0568 |
| 2018/0366724 | A1* | 12/2018 | Niina ................ H01M 4/485 |
| 2020/0381714 | A1* | 12/2020 | Suzuki ................ H01M 4/622 |
| 2020/0403204 | A1 | 12/2020 | Xiao et al. |
| 2021/0083294 | A1 | 3/2021 | Xiao et al. |
| 2021/0159493 | A1 | 5/2021 | Xiao et al. |
| 2022/0200039 | A1 | 6/2022 | Xiao et al. |
| 2023/0024073 | A1 | 1/2023 | Xiao et al. |
| 2023/0035392 | A1 | 2/2023 | Xiao et al. |

FOREIGN PATENT DOCUMENTS

| | | |
|---|---|---|
| CN | 106384841 A | 2/2017 |
| CN | 115621663 A | 1/2023 |
| CN | 115693029 A | 2/2023 |
| DE | 102022109356 A1 | 1/2023 |
| DE | 102022109657 A1 | 2/2023 |

OTHER PUBLICATIONS

CN 106025338 A Translation from Espacenet (Year: 2016).*

Liu, Jin et al., U.S. Appl. No. 16/863,655, filed Apr. 30, 2020 entitled "Solvent-Free Dry Powder Process To Incorporate Ceramic Particles Into Electrochemical Cell Components," 82 pages.

Xiao, Xingcheng et al., U.S. Appl. No. 17/128,905, filed Dec. 21, 2020 entitled "Lithium Battery Including Composite Flame Retardant Particles," 29 pages.

Xiao, Xingcheng et al., U.S. Appl. No. 17/375,414, filed Jul. 14, 2021 entitled "Lithium Ion-Exchanged Zeolite Particles for Electrochemical Cells and Methods of Making the Same," 54 pages.

Xu et al., Multifunctional Lithium-Ion-Exchanged Zeolite-Coated Separator for Lithium-Ion Batteries, ACS Applied Energy Materials, 1, 7237-7243 (Nov. 30, 2018).

Non-Final Office Action issued Jun. 1, 2023, for U.S. Appl. No. 17/375,414.

Final Office Action issued Sep. 15, 2023, for U.S. Appl. No. 17/375,414.

* cited by examiner

PROCESSES FOR PREPARING FUNCTIONAL PARTICLES FOR USE IN ELECTROCHEMICAL CELLS AND ELECTROCHEMICAL CELLS INCLUDING SAID FUNCTIONAL PARTICLES

INTRODUCTION

This section provides background information related to the present disclosure which is not necessarily prior art.

An electrochemical cell, such as a battery, is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

High-energy density, electrochemical cells, such as lithium ion batteries can be used in a variety of consumer products and vehicles, such as Hybrid Electric Vehicles (HEVs) and Electric Vehicles (EVs). Typical lithium ion, lithium sulfur, and lithium metal batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium ion batteries operate by reversibly passing lithium-ions back and forth between the negative electrode and the positive electrode. A separator and an electrolyte are disposed between the negative and positive electrodes. The electrolyte is suitable for conducting lithium ions and may be in solid (e.g., solid state diffusion) or liquid form. Each of the negative and positive electrodes is typically carried on or connected to a metallic current collector, for example, in the form of a thin layer of electrode material. The current collectors may be connected to each other by an interruptible external circuit through which electrons can pass from one electrode to the other while lithium ions migrate in the opposite direction through the electrochemical cell during charging and discharge of the battery.

Lithium ion batteries can reversibly supply power to an associated load device on demand. More specifically, electrical power can be supplied to a load device by a lithium ion battery until the lithium content of the negative electrode is effectively depleted. The battery may then be recharged by passing a suitable direct electrical current in the opposite direction between the electrodes.

During discharge, the negative electrode may contain a relatively high concentration of intercalated lithium, which is oxidized into lithium ions and electrons. The lithium ions travel from the negative electrode (anode) to the positive electrode (cathode), for example, through the ionically conductive electrolyte solution contained within the pores of an interposed porous separator. At the same time, the electrons pass through the external circuit from the negative electrode to the positive electrode. The lithium ions may be assimilated into the material of the positive electrode by an electrochemical reduction reaction. The battery may be recharged after a partial or full discharge of its available capacity by an external power source, which reverses the electrochemical reactions that transpired during discharge.

During recharge, intercalated lithium in the positive electrode is oxidized into lithium ions and electrons. The lithium ions travel from the positive electrode to the negative electrode through the porous separator via the electrolyte, and the electrons pass through the external circuit to the negative electrode. The lithium cations are reduced to elemental lithium at the negative electrode and stored in the material of the negative electrode for reuse.

During operation of the battery, trace water, hydrogen ions, hydrofluoric (HF) acid, dissociated transition metal ions (e.g., $Mn^{2+}$ and $Fe^{2+/3+}$ ions), polysulfides, and other target compounds can be formed in the liquid electrolyte and detrimentally effect battery operation. The removal of these target compounds from the liquid electrolyte during operation of the battery can, in turn, help prevent or mitigate degradation of various battery components and thereby improve the life and cycle performance of the battery. Thus, materials, such as functional particles, which can remove these target compounds from the liquid electrolyte without inhibiting the transport or net flow of lithium ions therethrough are needed for use in electrochemical cells as well as methods for making such materials.

SUMMARY

This section provides a general summary of the disclosure, and is not a comprehensive disclosure of its full scope or all of its features.

The present disclosure relates to a method of preparing functional lithium ion-exchanged zeolite particles for an electrochemical cell. The method includes (a) combining a solution including $(NH_4)_3PO_4$ with lithium ion-exchanged zeolite particles to form a first mixture, and adding a polymeric binder and a lithium salt to the first mixture to form a first slurry including the functional lithium ion-exchanged zeolite particles including $Li_3PO_4$.

The functional lithium ion-exchanged zeolite particles include cages defined by 8-membered rings, 9-membered rings, 10-membered rings, 12-membered rings or a combination thereof and the cages contain the $Li_3PO_4$. For example, the functional lithium ion-exchanged zeolite particles may include a zeolite material having a framework type selected from the group consisting of NAT, EDI, THO, ANA, YUG, GOO, MON, HEU, STI, BRE, FAU, MFI, LTL, LTA, and a combination thereof, such as a zeolite material selected from the group consisting of zeolite A, zeolite Y, zeolite L, ZSM-5, and a combination thereof.

The lithium salt may be selected from the group consisting of lithium hydroxide, lithium carbonate, lithium chloride, lithium nitrate, lithium sulfate, and a combination thereof.

The concentration of each of the $(NH_4)_3PO_4$ and the lithium salt may be about 0.01 M to about 1 M.

The method may further include applying the first slurry onto a first side of a porous separator, a second side of the porous separator, or both the first and second sides of the porous separator and solidifying the first slurry to form a coating layer including the functional lithium ion-exchanged zeolite particles. The coating layer may be present on the first side of the porous separator, the second side of the porous separator, or both the first and second sides of the porous separator. Additionally or alternatively, the method may further include incorporating the first slurry with the porous separator and solidifying the first slurry to form a filler comprising the functional lithium ion-exchanged zeolite particles within the porous separator.

In yet other aspects, the present disclosure relates to a method of preparing functional electrode particles for an electrochemical cell. The method includes (a) combining a solution including $(NH_4)_3PO_4$ with a polymeric binder to form a second mixture, (b) adding electroactive particles to the second mixture, and (c) adding a lithium salt to the second mixture to form a second slurry including functional electrode particles, wherein the functional electrode particles include the electroactive particles and $Li_3PO_4$.

The lithium salt may be selected from the group consisting of lithium hydroxide, lithium carbonate, lithium chloride, lithium nitrate, lithium sulfate, and a combination thereof.

The concentration of each of the $(NH_4)_3PO_4$ and the lithium salt may be about 0.01 M to about 1 M.

The electroactive particles may include $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P < 1$, $x+y+z+p=1$ (NCMA); $LiNiMnCoO_2$; $Li_2Fe_xM_{1-x}PO_4$, where M is Mn and/or Ni, $0 \leq x \leq 1$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

The method may further include applying the second slurry onto a third surface of a current collector, and solidifying the second slurry to form an electrode layer comprising the functional electrode particles.

In yet other aspects, the present disclosure relates to an electrochemical cell. The electrochemical cell includes a positive electrode layer includes a first electroactive material, and a negative electrode layer spaced apart from the positive electrode. The negative electrode includes a second electroactive material. The electrochemical cell further includes a porous separator disposed between confronting surfaces of the negative electrode and the positive electrode, and a liquid electrolyte infiltrating one or more of the negative electrode layer, the positive electrode layer, and the porous separator. The electrochemical further includes one or more of: (i) functional lithium ion-exchanged zeolite particles including $Li_3PO_4$; and (ii) functional electrode particles including (a) $Li_3PO_4$ and the first electroactive material, and/or (b) $Li_3PO_4$ and the second electroactive material. When present, the functional lithium ion-exchanged zeolite particles may be present as one or more of the following: (i) a coating layer present on a first side, a second side or both the first and second sides of the porous separator; and (ii) a filler in the porous separator. When present, the functional electrode particles may be present in one or more of the following: (i) the positive electrode layer; and (ii) the second electrode layer.

The functional lithium ion-exchanged zeolite particles include cages defined by 8-membered rings, 9-membered rings, 10-membered rings, 12-membered rings or a combination thereof and the cages contain the $Li_3PO_4$. For example, the functional lithium ion-exchanged zeolite particles may include a zeolite material having a framework type selected from the group consisting of NAT, EDI, THO, ANA, YUG, GOO, MON, HEU, STI, BRE, FAU, MFI, LTL, LTA, and a combination thereof, such as a zeolite material selected from the group consisting of zeolite A, zeolite Y, zeolite L, ZSM-5, and a combination thereof.

The first electroactive material may be selected from the group consisting of $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2Fe_xM_{1-x}PO_4$, where M is Mn and/or Ni, $0 \leq x \leq 1$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

The second electroactive material may include lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
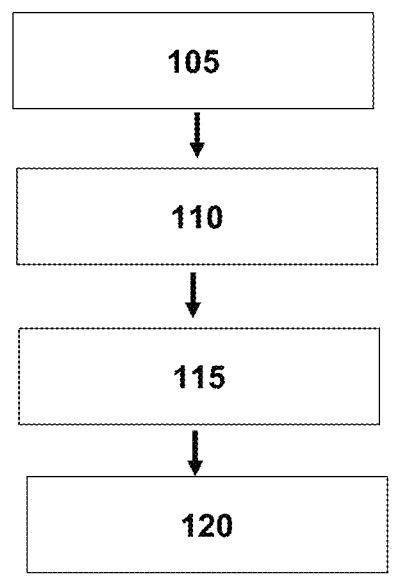
FIG. 1A is a flow diagram of an exemplary method of preparing functional lithium ion-exchanged zeolite particles according to the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

I. Methods of Preparing Functional Particles for Electrochemical Cells

Methods of preparing functional particles for an electrochemical cell are provided herein. As used herein, "functional particles" refer to particles including one or more complexes, such as $Li_3PO_4$, $Al_2O_3$, and $SiO_2$, which can be nanosized, and can function as a hydrofluoric (HF) acid scavenger in an electrochemical cell. Furthermore, incorporation of $Li_3PO_4$ in the particles is advantageous because $Li_3PO_4$ has fire retardant properties and can help prevent a fire during a thermal runaway event for the battery. The term "nanosize" refers to a particle having a diameter of 1 nm to 900 nm. The functional particles may be functional lithium ion-exchanged zeolite particles and/or functional electrode particles. It has been discovered that such functional particles can be formed by mixing a first precursor, such as $(NH_4)_3PO_4$, with a second precursor, such as a lithium salt, in a step-by-step fashion as further described below so that the $Li_3PO_4$ can be advantageously formed in-situ leading to a uniform distribution of $Li_3PO_4$ particles.

For example, methods for preparing functional lithium ion-exchanged zeolite particles are provided herein. The functional lithium ion-exchanged zeolite particles may comprise or consist essentially of particles of one or more natural or synthetic zeolite materials. As used herein, "zeolite" is defined to refer to a synthetic or natural crystalline material having a porous framework structure built from tetrahedra atoms (e.g., silicon, aluminum, phosphorus) connected by bridging oxygen atoms. Zeolites can comprise a three-dimensional framework of $AlO_2$ and $SiO_2$ tetrahedral units and extra-framework cations. Each $AlO_2$ unit introduces one negative charge to the framework, which is offset by the extra-framework cations. The extra-framework cations may be organic or inorganic in nature. As used herein, the term "lithium ion-exchanged zeolite particle" means a zeolite that has been ion-exchanged with lithium ions such that a plurality of lithium ions are present within the zeolite as free ions and/or as extra-framework ions.

In various aspects, the functional lithium ion-exchanged zeolite particles may comprise a three-dimensional framework of $AlO_2$ and $SiO_2$ tetrahedral units and extra-framework lithium cations (Li+). The amount of extra-framework lithium cations present in the functional lithium ion-exchanged zeolite particles can at least partially depend on the Si:Al ratio of the specific zeolite material and the cation exchange capacity (CEC) of the zeolite material. In the functional lithium ion-exchanged zeolite particles, lithium cations (Li+) may comprise greater than or equal to about 90 atomic % (at. %), greater than or equal to about 95 at. %, greater than or equal to 99 at. %, or about 100 at. % of the extra-framework cations in the zeolite particles. In some embodiments, the zeolite may be in dehydrated form.

The zeolite framework has voids or pores in the form of cages or channels between the tetrahedra, which are defined by rings of interconnected oxygen (O), silicon (Si), phosphorus (P) and/or aluminum (Al) atoms. Zeolite particles may have an average pore size diameter of less than or equal to about 1.5 nm, less than or equal to about 1 nm, less than or equal to about 0.75 nm, less than or equal to about 0.5 nm, less than or equal to about 0.25 nm, less than or equal to about 0.1 nm, or about 0.05 nm. Additionally or alternatively, the zeolite particles may have an average pore size diameter of greater than or equal to about 0.1 nm to less than or equal to about 1.5 nm, greater than or equal to about 0.1 nm to less than or equal to about 1 nm, or greater than or equal to about 0.35 nm to less than or equal to about 0.7 nm. Zeolite materials having pore openings with widths or diameters as described above may include zeolite materials having pore openings defined by 8-membered, 9-membered, 10-membered, and/or 12-membered rings.

Examples of known zeolite frameworks are given in the "Atlas of Zeolite Frameworks" published on behalf of the Structure Commission of the International Zeolite Association", 6th revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework.

In some embodiments, the functional lithium ion-exchanged zeolite particles, for example, prior to operation in an electrochemical cell, may comprise less than or equal to about 10 at. %, less than or equal to about 5 at. %, less than or equal to about 1 at. %, less than or equal to about 0.5 at. % or less than or equal to about 0.1 at. % of one or more of the following extra-framework cations: $Na^+$, $K^+$, $Mg^{2+}$, $Ca^+$, $H^+$, and $NH_4^+$. In some embodiments, the functional lithium ion-exchanged zeolite particles may comprise less than or equal about 1 at. % or less than or equal to about 0.1 at % of one or more of $Na^+$, $H^+$, $Ca^+$, $K^+$, and/or $NH_4^+$. In some embodiments, the lithium ion-exchanged zeolite particles may comprise $NH_4^+$ in an amount greater than one or more of the following cations: $Na^+$, $K^+$, $Mg^{2+}$, and $Ca^+$ Additionally or alternatively, the lithium ion-exchanged zeolite particles may be substantially free of one or more of: $Na^+$, $K^+$, $Mg^{2+}$, $NH_4^+$, and $Ca^+$ cations.

As illustrated in FIG. 1A, the method may include a step 105 of mixing a suitable amount of $(NH_4)_3PO_4$ with water or a solvent to form a solution (aqueous or non-aqueous solution) comprising $(NH_4)_3PO_4$, for example, in a first container, at a sufficient temperature and for a sufficient amount of time. In a further step 110, the method includes combining the solution comprising $(NH_4)_3PO_4$ with lithium ion-exchanged zeolite particles, for example, in the first container, at a sufficient temperature and for a sufficient amount of time to form a first mixture. In any embodiment, the concentration of $(NH_4)_3PO_4$ in step 105 and combined with the lithium ion-exchanged zeolite particles in step 110 may be greater than or equal to about 0.001 M, greater than or equal to about 0.01 M, greater than or equal to about 0.05 M, greater than or equal to about 0.1 M, greater than or equal to about 0.25 M, greater than or equal to about 0.5 M, greater than or equal to about 0.75 M, greater than or equal to about 1 M, greater than or equal to about 1.5 M, greater than or equal to about 2 M, or about 5 M; or from about 0.001 M to about 5 M, about 0.01 M to about 5 M, about 0.01 M to about 2 M, about 0.01 M to about 1.5 M, about 0.01 M to about 1 M, about 0.01 M to about 0.75 M, about 0.1 M to about 5 M, about 0.1 M to about 2 M, or about 0.1 M to about 1 M.

In step 115, the method includes adding a polymeric binder and a lithium salt to the first mixture at a sufficient temperature and for a sufficient amount of time to form a first slurry comprising the functional lithium ion-exchanged zeolite particles comprising $Li_3PO_4$. It is contemplated herein that the polymeric binder and the lithium salt may be added to the first mixture at substantially the same time (or concurrently) or the polymeric binder and the lithium salt may be added to the first mixture sequentially at different times. For example, the polymeric binder may be added to the first mixture followed by addition of the lithium salt to the first mixture or the lithium salt may be added to the first mixture followed by addition of the polymeric binder to the first mixture.

In any one of steps 105, 110, and 115, mixing may occur. Additionally or alternatively, any one of steps 105, 110, and 115 each may be performed at a temperature of greater than or equal to about 18° C., greater than or equal to about 20° C., greater than or equal to about 25° C., greater than or equal to about 30° C., greater than or equal to about 60° C., greater than or equal to about 80° C., greater than or equal to about 90° C., greater than or equal to about 100° C., greater than or equal to about 120° C., or about 150° C.; from about 18° C. to about 150° C., about 18° C. to about 120° C., about 18° C. to about 90° C., about 18° C. to about 60° C., about 25° C. to about 120° C., about 50° C. to about 90° C., or about 80° C. to about 120° C. Additionally or alternatively, any one of steps 105, 110, and 115 each may be performed for greater than or equal to about 1 minute, greater than or equal to about 5 minutes, greater than or equal to about 10 minutes, greater than or equal to about 15 minutes, greater than or equal to about 30 minutes, greater than or equal to about 60 minutes, greater than or equal to about 2 hours, greater than or equal to about 6 hours, greater than or equal to about 12 hours, greater than or equal to about 18 hours, greater than or equal to about 24 hours, or about 48 hours; or from about 1 minute to about 48 hours, about 1 minute to about 24 hours, about 1 minute to about 12 hours, about 1 minute to about 6 hours, about 1 minute to about 2 hours, about 5 minutes to about 48 hours, about 5 minutes to about 24 hours, about 10 minutes to about 48 hours, about 10 minutes to about 24 hours, about 10 minutes to about 12 hours, about 10 minutes to about 6 hours, about 10 minutes to about 2 hours, about 30 minutes to about 48 hours, about 30 minutes to about 24 hours, about 60 minutes to about 48 hours, about 60 minutes to about 24 hours, about 6 hours to about 24 hours, about 12 hours to about 24 hours, about 18 hours to about 24 hours, or about 24 hours to about 48 hours. For example, steps 105 and/or 110 may performed at a temperature of about 18° C. to about 90° C. for about 1 minute to about 2 hours and step 115 may be performed at a temperature of about 18° C. to about 60° C. for about 10 minutes to about 2 hours.

The polymeric binder and the lithium salt may each be present in an aqueous solution or a non-aqueous solution (i.e., in a solvent) prior to adding to the first mixture. The polymeric binder may comprise any material that comprises or contains a polymer and may include composite materials that include a combination of a polymer and a non-polymeric material. The term "polymer" is used in its broad sense to denote both homopolymers and heteropolymers. Homopolymers are made of a single type of polymer, while heteropolymers (also known as copolymers) are made of two (or more) different types of monomers. In one form, the polymeric binder may be formed from a two-component polymeric binder system that includes a polymer precursor component and a crosslinking component. In such case, the method may include the following general steps: (1) providing a polymer precursor component including a polymer or polymer precursor (e.g., monomer or oligomer) dissolved or homogenously dispersed in a solvent or in water, (2) adding the polymer precursor component to the first mixture to form an intermediate mixture, and then (3) mixing a crosslinking component into the intermediate mixture to form the first slurry. The intermediate mixture may have a viscosity in the range 400-1200 mPa·s at a temperature of about 25° C. When the polymer precursor component and the crosslinking component are combined during formation of the first slurry, a chemical reaction referred to as polymerization occurs between the components which causes the components to bind together (e.g., by the formation of stable covalent bonds) to form crosslinked networks known as polymers. The mass ratio of the polymer precursor component to the crosslinking component may be in the range of about 10:1 to about 5:1. For example, the mass ratio of the polymer precursor component to the crosslinking component may be about 9:1.

Additional solvent or water may be added to the polymer precursor component and/or the intermediate mixture to control or adjust the viscosity and/or the thixotropic or rheological properties of the slurry prior to addition of the crosslinking component. Some specific examples of suitable aqueous and non-aqueous solvents that may be included in or added to the polymer precursor component and/or the intermediate mixture include: water, N-methyl-2-pyrrolidone (NMP), toluene, and combinations thereof.

Some specific examples of suitable polymer precursor components include: alginate (e.g., sodium and/or ammonium alginate), polyvinyl alcohol (PVA), polyacrylic acid (PAA), carboxymethyl cellulose (CMC), styrene-butadiene rubber (SBR), fluorine-acrylic hybrid latex, and combinations thereof.

The crosslinking component may comprise a polymeric material or a non-polymeric material. For example, the crosslinking component may comprise a polymer or polymer precursor (e.g., monomer or oligomer). Some specific examples of suitable crosslinking components include: dimethylol urea, melamine formaldehyde resin, polyamideepichlorohydrin (PAE) resin, N-(1-hydroxy-2,2-dimethoxyethyl)acrylamide, N,N'-methylenebisacrylamide, ethylene glycol dimethacrylate, and combinations thereof.

In any embodiment, the lithium salt may comprise lithium hydroxide (LiOH), lithium carbonate ($Li_2CO_3$), lithium chloride (LiCl), lithium nitrate ($LiNO_3$), lithium sulfate ($Li_2SO_4$), or a combination thereof. In one embodiment, the lithium salt may be LiOH. In any embodiment, the concentration of lithium salt added in step 115 may be greater than or equal to about 0.001 M, greater than or equal to about 0.01 M, greater than or equal to about 0.05 M, greater than or equal to about 0.1 M, greater than or equal to about 0.25 M, greater than or equal to about 0.5 M, greater than or equal to about 0.75 M, greater than or equal to about 1 M, greater than or equal to about 1.5 M, greater than or equal to about 2 M, or about 5 M; or from about 0.001 M to about 5 M, about 0.01 M to about 5 M, about 0.01 M to about 2 M, about 0.01 M to about 1.5 M, about 0.01 M to about 1 M, about 0.01 M to about 0.75 M, about 0.1 M to about 5 M, about 0.1 M to about 2 M, or about 0.1 M to about 1 M.

The addition of a lithium salt to the first mixture can be represented by the exemplary reaction equation (1) below:

$$3LiOH+(NH_4)_3PO_4=Li_3PO_4\downarrow+3NH_3\uparrow+3H_2O \qquad (1).$$

In any embodiment, a ratio of the lithium salt to the $(NH_4)_3PO_4$ can be at least about 1% greater than a stoichiometric ratio between the lithium salt and $(NH_4)_3PO_4$, for example, greater than about 2%, greater than about 3%, greater than about 4%, greater than about 5%, greater than about 7%, or about 10% greater than the stoichiometric ratio between the lithium salt and $(NH_4)_3PO_4$. In other words, about a 10% or less (e.g., 1%, 2%, 3%, 4%, 5%, etc.) excess of lithium salt may be used.

Figure 1B:
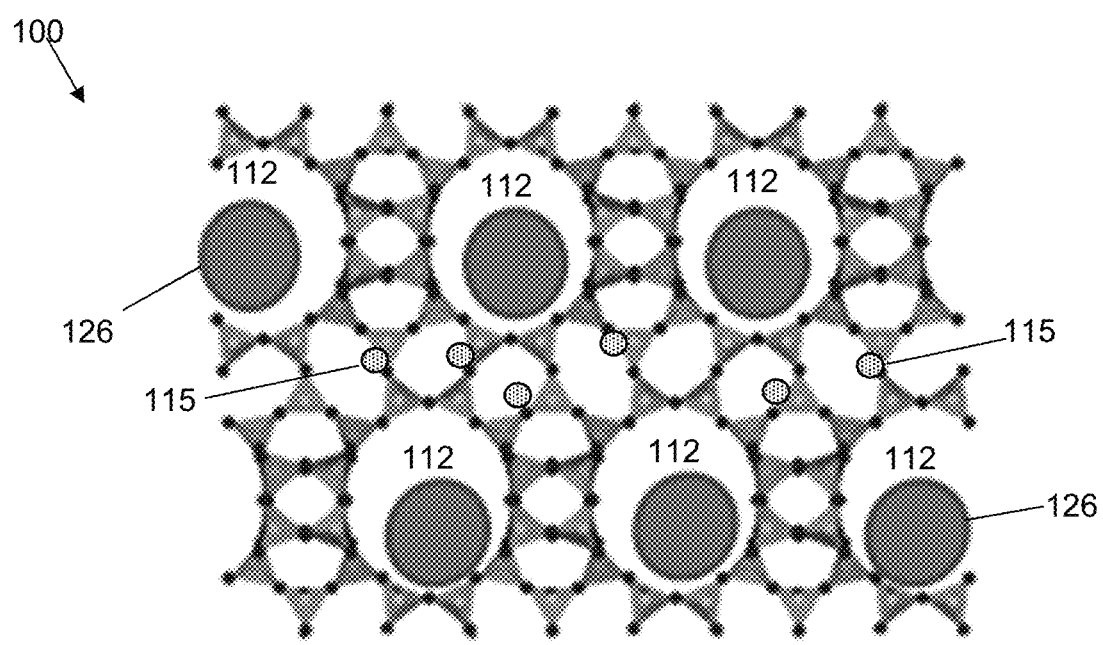
FIG. 1B is an illustration of an exemplary functional lithium ion-exchanged zeolite particle according to the present disclosure.

As stated above, the first slurry comprises the functional lithium ion-exchanged zeolite particles comprising $Li_3PO_4$ as well as the polymeric binder. It has been discovered that the $Li_3PO_4$ formed during the reaction can be present within the cages of the functional lithium ion-exchanged zeolite particles. For example, as depicted in FIG. 1B, a functional lithium ion-exchanged zeolite particle 100 formed according to the above described method herein may include $Li^+$ cations 115 as extra framework cations. Additionally, the functional lithium ion-exchanged zeolite particle may also include a $Li_3PO_4$ complex 126. As illustrated in FIG. 1B, the $Li_3PO_4$ complex 126 may be present within or contained within cages 112 of the functional lithium ion-exchanged zeolite particle 100. In other words, the cages 112 may include or comprise one or more $Li_3PO_4$ complex 126.

It is contemplated herein that the concentration of $(NH_4)_3PO_4$ and the lithium salt (e.g., LiOH) may be adjusted, based on the amount of cations in the lithium ion-exchanged zeolite particles, to ensure that $Li_3PO_4$ forms inside the cages of the lithium ion-exchanged zeolite particles.

The zeolite particles prior to combination with the $(NH_4)_3PO_4$ and the lithium salt to form the functional lithium ion-exchanged zeolite particles are referred to herein as "lithium ion-exchanged zeolite particles." The lithium ion-exchanged zeolite particles may have a framework selected from the group consisting of NAT, EDI, THO, ANA, YUG, GOO, MON, HEU, STI, BRE, FAU, MFI, LTL, LTA, and a combination thereof. For example, the lithium ion-exchanged zeolite particles may comprise a zeolite material selected from the group consisting of zeolite A, zeolite Y, zeolite L, ZSM-5, and a combination thereof. Furthermore, the lithium ion-exchanged zeolite particles and the functional lithium ion-exchanged zeolite particles formed therefrom may have substantially the same pore size diameter, substantially the same particle size diameter and substantially the same $SiO_2:Al_2O_3$ ratio as described herein. For example, lithium ion-exchanged ZSM-5 particles (lithium ion-exchanged zeolite particles) having an average pore diameter of about 0.5 nm, an average particle size diameter of 100 nm and a $SiO_2:Al_2O_3$ ratio of about 20 may form functional lithium ion-exchanged ZSM-5 particles having substantially the same pore size diameter, particle size diameter, and $SiO_2:Al_2O_3$ as the initial lithium ion-exchanged ZSM-5 particles. It is contemplated herein, that the resultant functional lithium ion-exchanged zeolite particles may have some variation (e.g., about 1-5%) in pore size diameter, particle size diameter and $SiO_2:Al_2O_3$ ratio compared to the lithium ion-exchanged zeolite particles.

In any embodiment, the functional lithium ion-exchanged zeolite particles may have an average particle diameter of less than or equal to about 20 μm, less than or equal to about 15 μm, less than or equal to about 10 μm, less than or equal to about 5 μm, less than or equal to about 1 μm, less than or equal to about 100 nm, less than or equal to about 50 nm, or about 10 nm. Additionally or alternatively, the functional lithium ion-exchanged zeolite particles may have an average particle diameter of greater than or equal to about 10 nm to less than or equal to about 20 μm, greater than or equal to about 10 nm to less than or equal to about 10 μm, greater than or equal to about 10 nm to less than or equal to about 5 μm or greater than, or equal to about 10 nm to less than or equal to about 1 μm.

The crystal structures of zeolites include interstitial spaces (or cages) of molecular dimensions. As such, zeolites may be used as adsorbents to selectively adsorb molecules by retaining the molecules within their interstitial spaces. Access to the interstitial spaces within a zeolite is provided by pore openings (or channels) in the crystal lattice of the zeolite, which are defined by rings of interconnected oxygen (O), silicon (Si), and/or aluminum (Al) atoms. The size and shape of these pore openings limit the size and shape of the molecules that can be adsorbed by the zeolite and are determined, at least in part, by the number of tetrahedral units (or, alternatively, oxygen atoms) that make up the rings and by the type of extra-framework cations present within the zeolite. Thus, the functional lithium-exchanged zeolite particles may have an average pore size diameter capable of one or more of the following: (i) selectively absorbing water molecules (e.g., trace amounts) from the liquid electrolyte, without adsorbing the organic solvent molecules or the lithium salt ions in the electrolyte solution in the electrolyte; and (ii) allowing substantially only $Li^+$ ions through the separator while blocking polysulfide migration, for example, in a lithium sulfur battery. In some embodiments, the functional lithium ion-exchanged zeolite particles may have an average pore size diameter larger than the ionic radius of water ($H_2O$), but less than the ionic radius of the organic solvent molecules in the electrolyte solution. In particular, the functional lithium ion-exchanged zeolite particles may have an average pore size diameter of less than or equal to about 1.5 nm, less than or equal to about 1 nm, less than or equal to about 0.75 nm, less than or equal to about 0.5 nm, less than or equal to about 0.25 nm, less than or equal to about 0.1 nm, or about 0.05 nm. Additionally or alternatively, the functional lithium ion-exchanged zeolite particles may have an average pore size diameter of greater than or equal to about 0.05 nm to less than or equal to about 1.5 nm, greater than or equal to about 0.05 nm to less than or equal to about 1 nm, greater than or equal to about 0.1 nm to less than or equal to about 1 nm, or greater than or equal to about 0.25 nm to less than or equal to about 0.75 nm. Zeolite materials having pore openings with widths or diameters as described above may include zeolite materials having pore openings defined by 8-membered, 9-membered, 10-membered, and/or 12-membered rings.

In some embodiments, the functional lithium ion-exchanged zeolite particles may comprise particles of a zeolite material having a $SiO_2:Al_2O_3$ ratio of less than or equal to about 50, less than or equal to about 40, less than or equal to about 30, less than or equal to about 20, or about 10. The functional lithium ion-exchanged zeolite particles may comprise particles of a zeolite material having a $SiO_2:Al_2O_3$ ratio in the range of greater than or equal to about 10 to less than or equal to about 50, greater than or equal to about 10 to less than or equal to about 40, greater than or equal to about 10 to less than or equal to about 20, greater than or equal to about 20 to less than or equal to about 50, about 20 to about 40, or about 30 to about 50. In some embodiments, functional lithium ion-exchanged zeolite particles with more $SiO_2$ compared to $Al_2O_3$, for example, having a $SiO_2:Al_2O_3$ ratio greater than about 10, are preferred, for example, for increased stability. In other embodiments, functional lithium ion-exchanged zeolite particles with more $Al_2O_3$ compared to $SiO_2$, for example, having a $SiO_2:Al_2O_3$ ratio less than about 10, are provided, for example, for an increased hydrofluoric acid (HF) scavenger function of the porous separator to protect the positive electrode.

The functional lithium ion-exchanged zeolite particles may comprise a zeolite material having a framework type selected from the group consisting of NAT, EDI, THO, ANA, YUG, GOO, MON, HEU, STI, BRE, FAU, MFI, LTL, LTA, and a combination thereof. For example, the functional lithium ion-exchanged zeolite particles may comprise a zeolite material selected from the group consisting of zeolite A, zeolite Y, zeolite L, ZSM-5, and a combination thereof.

Figure 1C:
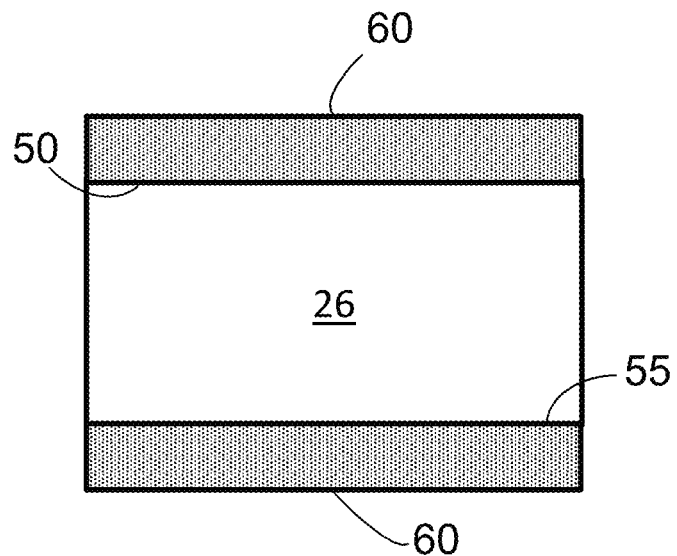
FIG. 1C is an illustration of a porous separator including a coating layer according to the present disclosure.

Additionally or alternatively, the method may further include an optional step 120 including applying the first slurry onto a substrate, such as porous separator, and solidifying the first slurry to form a coating layer comprising the functional lithium ion-exchanged zeolite particles. For example, as depicted in FIG. 1C, the first slurry may be applied to a first side 50 of a porous separator 26 and a second side of the porous separator 26 and solidified to form a coating layer 60 comprising the functional lithium ion-exchanged zeolite particles (e.g., functional lithium ion-exchanged zeolite particles 100). It is contemplated herein that the first slurry may be applied to the first side 50 of the porous separator 26 or the second side 55 of the porous separator 26 or both the first and second sides 50, 55 of the porous separator 26. Thus, the coating layer 60 may be present on the first side 50 of the porous separator 26 or on the second side 55 of the porous separator 26 or on both the first and second sides 50, 55 of the porous separator 26

The first slurry may be coated or otherwise applied to by any suitable method. For example, the slurry may be spread or cast onto the first and/or second sides 50, 55 of the separator 26. Thereafter the first slurry may be solidified by any suitable method to form the coating layer 60. Thus, the coating layer 60 includes the functional lithium ion-exchanged zeolite particles including $Li_3PO_4$ dispersed within the polymeric binder. For example, the first slurry may be dried and cured (e.g., thermal curing, ultraviolet (UV) curing) to remove any solvent and/or water and to complete the crosslinking or polymerization reaction. The drying and/or curing may both accomplished via heating the first slurry present on the separator to a suitable temperature, for example, a temperature in the range of about 30° C. to about 140° C. for about 3 minutes to about 2 hours. Additionally or alternatively, the drying may be performed via heating the first slurry present on the separator to a suitable temperature and also exposing the first slurry present on the separator to UV radiation. Thereafter, the separator 26, including the first and/or second active layers 50, 55, may be held at room temperature and exposed to a sub-atmospheric pressure environment for a time in the range of 3 hours to 12 hours to remove residual volatile compounds (e.g., water) therefrom. In some instances, the first slurry may be applied to the first or second side 50, 56 of the separator 26 and solidified, and then the first slurry may be applied to the opposite side 50, 56 of the separator 26 and solidified prior to exposing the separator 26 with coating layer 60 to the sub-atmospheric pressure environment.

Figure 1D:
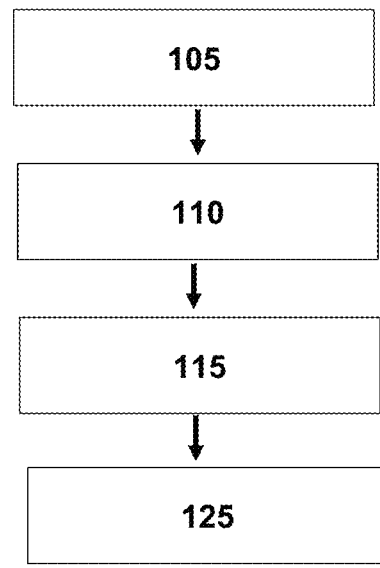
FIG. 1D is a flow diagram of an alternative exemplary method of preparing functional lithium ion-exchanged zeolite particles according to the present disclosure.

Additionally or alternatively, the method may further include an optional step 125, as shown in FIG. 1D, including incorporating the first slurry with the porous separator and solidifying the first slurry to form a filler comprising the functional lithium ion-exchanged zeolite particles, which is present within the porous separator. For example, the first slurry may be mixed with the precursor materials (e.g., polymeric precursors, nonwoven material described below, fibrous membrane) used to form the porous separator and solidified during fabrication of the porous separator. The solidifying may be performed as described above, for example, via drying and curing (e.g., thermal curing, ultraviolet (UV) curing) to remove any solvent and/or water and to complete the crosslinking or polymerization reaction.

Figure 2A:
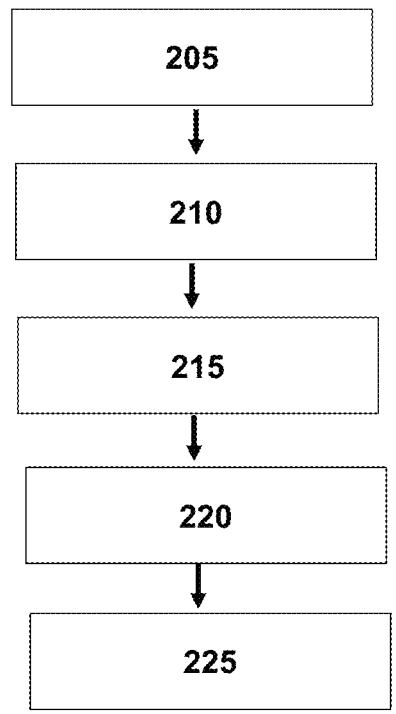
FIG. 2A is a flow diagram of an exemplary method of preparing functional electrode particles according to the present disclosure.

In a further embodiment, methods for preparing functional electrode particles for electrochemical cells are provided. For example, as depicted in FIG. 2A, the method may include a step 205 of mixing a suitable amount of $(NH_4)_3PO_4$ with water or a solvent to form a solution (aqueous or non-aqueous solution) comprising $(NH_4)_3PO_4$, for example, in a first container, at a sufficient temperature and for a sufficient amount of time. In a further step 210, the method includes combining the solution comprising $(NH_4)_3PO_4$ and a polymeric binder as described herein in a manner as described herein, for example, in the first container, at a sufficient temperature and for a sufficient amount of time to form a second mixture. The polymeric binder may be present in an aqueous solution or a non-aqueous solution (i.e., in a solvent) prior to adding to the aqueous solution comprising $(NH_4)_3PO_4$. In any embodiment, the concentration of $(NH_4)_3PO_4$ in step 205 and combined with the polymeric binder in step 210 may be greater than or equal to about 0.001 M, greater than or equal to about 0.01 M, greater than or equal to about 0.05 M, greater than or equal to about 0.1 M, greater than or equal to about 0.25 M, greater than or equal to about 0.5 M, greater than or equal to about 0.75 M, greater than or equal to about 1 M, greater than or equal to about 1.5 M, greater than or equal to about 2 M, or about 5 M; or from about 0.001 M to about 5 M, about 0.01 M to about 5 M, about 0.01 M to about 2 M, about 0.01 M to about 1.5 M, about 0.01 M to about 1 M, about 0.01 M to about 0.75 M, about 0.1 M to about 5 M, about 0.1 M to about 2 M, or about 0.1 M to about 1 M.

The method may further include a step 215 of adding electroactive particles to the second mixture as well as a step 220 of adding a lithium salt as described herein (e.g., LiOH) to the second mixture to form a second slurry comprising functional electrode particles. The functional electrode particles include the electroactive particles and $Li_3PO_4$ particles or complexes. The addition of a lithium salt to the second mixture can also be represented by the exemplary reaction equation (1) shown above in excess as described above It is contemplated herein that the electroactive particles and the lithium salt may be added to the second mixture at substantially the same time (or concurrently) or the electroactive particles and the lithium salt may be added to the second mixture sequentially at different times. For example, the electroactive particles may be added to the second mixture followed by addition of the lithium salt to the second mixture or the lithium salt may be added to the second mixture followed by addition of the electroactive particles to the second mixture. The lithium salt may be present in an aqueous solution or a non-aqueous solution (i.e., in a solvent) prior to adding to the second mixture. In any embodiment, the concentration of lithium salt added in step 220 may be greater than or equal to about 0.001 M, greater than or equal to about 0.01 M, greater than or equal to about 0.05 M, greater than or equal to about 0.1 M, greater than or equal to about 0.25 M, greater than or equal to about 0.5 M, greater than or equal to about 0.75 M, greater than or equal to about 1 M, greater than or equal to about 1.5 M, greater than or equal to about 2 M, or about 5 M; or from about 0.001 M to about 5 M, about 0.01 M to about 5 M, about 0.01 M to about 2 M, about 0.01 M to about 1.5 M, about 0.01 M to about 1 M, about 0.01 M to about 0.75 M, about 0.1 M to about 5 M, about 0.1 M to about 2 M, or about 0.1 M to about 1 M. In any embodiment, a ratio of the lithium salt to the $(NH_4)_3PO_4$ can be at least about 1% higher than a stoichiometric ratio between the lithium salt and $(NH_4)_3PO_4$, for example, greater than about 2%, greater than 3 about %, greater than about 4%, greater than about 5%, greater than about 7%, or about 10% greater than the stoichiometric ratio between the lithium salt and $(NH_4)_3PO_4$.

In any one of steps 205, 210, 215, and 220 mixing may occur. Additionally or alternatively, any one of steps 205, 210, 215, and 220 each may be performed at a temperature of greater than or equal to about 18° C., greater than or equal to about 20° C., greater than or equal to about 25° C., greater than or equal to about 30° C., greater than or equal to about 60° C., greater than or equal to about 80° C., greater than or equal to about 90° C., greater than or equal to about 100° C., greater than or equal to about 120° C., or about 150° C.; from about 18° C. to about 150° C., about 18° C. to about 120° C., about 18° C. to about 90° C., about 18° C. to about 60° C., about 25° C. to about 120° C., about 50° C. to about 90° C., or about 80° C. to about 120° C. Additionally or alternatively, any one of steps 105, 110, and 115 each may be performed for greater than or equal to about 1 minute, greater than or equal to about 5 minutes, greater than or equal to about 10 minutes, greater than or equal to about 15 minutes, greater than or equal to about 30 minutes, greater than or equal to about 60 minutes, greater than or equal to about 2 hours, greater than or equal to about 6 hours, greater than or equal to about 12 hours, greater than or equal to about 18 hours, greater than or equal to about 24 hours, or about 48 hours; or from about 1 minute to about 48 hours, about 1 minute to about 24 hours, about 1 minute to about 12 hours, about 1 minute to about 6 hours, about 1 minute to about 2 hours, about 5 minutes to about 48 hours, about 5 minutes to about 24 hours, about 10 minutes to about 48 hours, about 10 minutes to about 24 hours, about 10 minutes to about 12 hours, about 10 minutes to about 6 hours, about 10 minutes to about 2 hours, about 30 minutes to about 48 hours, about 30 minutes to about 24 hours, about 60 minutes to about 48 hours, about 60 minutes to about 24 hours, about 6 hours to about 24 hours, about 12 hours to about 24 hours, about 18 hours to about 24 hours, or about 24 hours to about 48 hours. For example, steps 205 and/or 210 may performed at a temperature of about 18° C. to about 90° C. for about 1 minute to about 2 hours and steps 215 and/or 220 may be performed at a temperature of about 18° C. to about 60° C. for about 10 minutes to about 2 hours.

The electroactive particles may be any suitable electroactive material for incorporation into an electrode. For example, the electroactive particles may be suitable for a positive electrode. Such electroactive particles may include, but is not limited to, $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P < 1$, $x+y+z+p=1$ (NCMA); $LiNiMnCoO_2$; $Li_2Fe_xM_{1-x}PO_4$, where M is Mn and/or Ni, $0 \leq x \leq 1$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, or combinations thereof. Additionally or alternatively, the electroactive particles may be suitable for a negative electrode. Such electroactive particles may include, but is not limited to, lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or combinations thereof.

It is contemplated herein that the electroactive particles may have a round geometry or an axial geometry. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry electroactive material particles suitable for use in the present disclosure may have high aspect ratios, ranging from about 10 to about 5,000, for example. In certain variations, the first electroactive material particles having an axial-geometry include fibers, wires, flakes, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes.

Figure 2B:
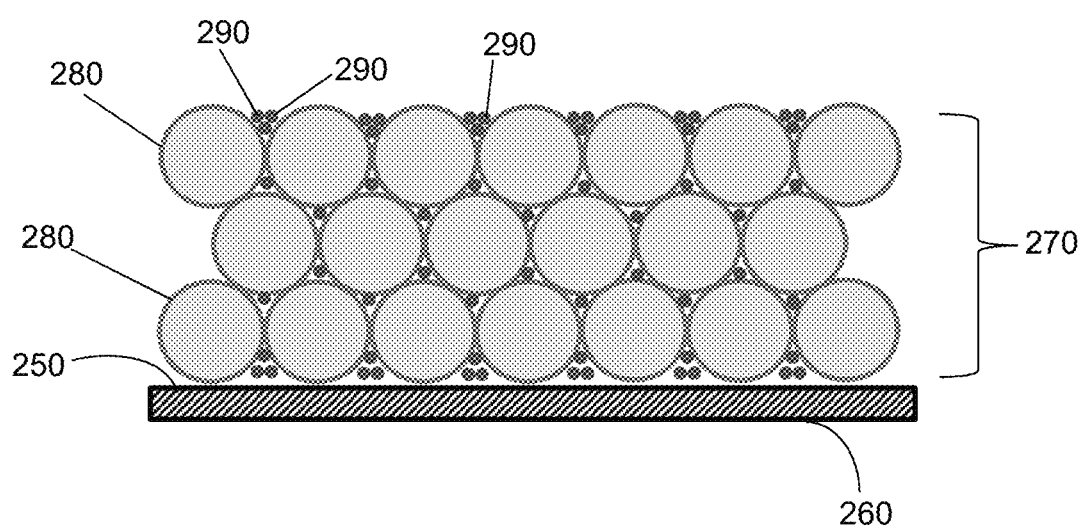
FIG. 2B is an illustration of an electrode layer including functional electrode particles according to the present disclosure.

Additionally or alternatively, the method may further include an optional step 225 including applying the second slurry onto a current collector, for example, a positive electrode current collector or a negative electrode current collector. The second slurry may be coated or otherwise applied to by any suitable method and solidified by any suitable method to form an electrode layer comprising the functional electrode particles. For example, as depicted in FIG. 2B, the second slurry may be spread or cast onto a third side 250 of a current collector 260. Thereafter the first slurry may be solidified by any suitable method as described herein to form the electrode layer 270. The electrode layer 270 includes the electroactive particles 280 and $Li_3PO_4$ particles 290 dispersed within the polymeric binder (not shown). The solidifying may be performed as described above, for example, via drying and curing (e.g., thermal curing, ultraviolet (UV) curing) to remove any solvent and/or water and to complete the crosslinking or polymerization reaction. Advantageously, the methods described herein can prevent smaller particles (e.g., $Li_3PO_4$) from segregating from the larger particles (e.g., electroactive particles) resulting in functional electrode particles with more uniform particle size distribution without substantial particle segregation.

II. Electrochemical Cell

Lithium-containing electrochemical cells typically include a negative electrode, a positive electrode, an electrolyte for conducting lithium ions between the negative and positive electrodes, and a porous separator between the negative electrode and the positive electrode to physically separate and electrically insulate the electrodes from each other while permitting free ion flow. When assembled in an electrochemical cell, for example, in a lithium-ion battery, the porous separator is infiltrated with a liquid electrolyte. It has been discovered that functional particles as described herein, for example, present in a coating layer on the porous separator, as a filler in the porous separator, and/or in the electrode layer, can actively remove trace water, hydrogen ions, hydrofluoric acid, dissociated transition metal ions (e.g., $Mn^{2+}$ and $Fe^{2+/3+}$ ions), polysulfides, and other target compounds from the liquid electrolyte without inhibiting the transport or net flow of lithium ions therethrough. The removal of these target compounds from the liquid electrolyte during operation of the battery can, in turn, help prevent or mitigate degradation of various battery components and thereby improve the life and cycle performance of the battery.

Figure 3:
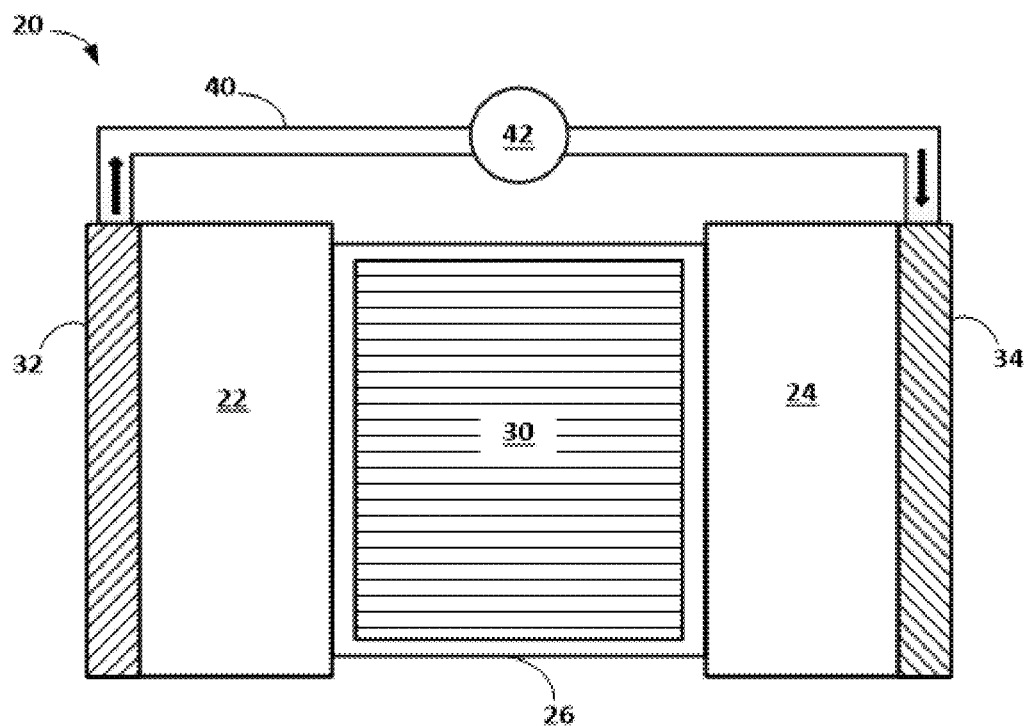
FIG. 3 is a schematic of an exemplary electrochemical battery cell according to the present disclosure.

An electrochemical cell for use in batteries, for example, a lithium ion battery, or as capacitors is provided herein. For example, an exemplary and schematic illustration of an electrochemical cell 20 (also referred to as the lithium ion battery or battery 20) is shown in FIG. 3. Electrochemical cell 20 includes a negative electrode 22 (also referred to as a negative electrode layer 22), a first current collector 32 (also referred to as a negative electrode current collector 32) may be positioned at or near the negative electrode 22, a positive electrode 24 (also referred to as a positive electrode layer 24), a second current collector 34 (also referred to as a positive electrode current collector 34) may be positioned at or near the positive electrode 24, and a separator 26 disposed between the positive electrode layer 24 and the first current collector 32. The space between (e.g., the separator 26) the negative electrode layer 22 and positive electrode layer 24 can be filled with the electrolyte 30. If there are pores inside the negative electrode layer 22 and/or the positive electrode layer 24, the pores may also be filled with the electrolyte 30. The electrolyte 30 can impregnate, infiltrate, or wet the surfaces of and fills the pores of each of the negative electrode layer 22, the positive electrode layer 24, and the porous separator 26.

The first current collector 32 and second current collector 34 respectively collect and move free electrons to and from an external circuit 40. An interruptible external circuit 40 and load device 42 connects the first current collector 32 and the second current collector 34. Each of the negative electrode layer 22, the positive electrode layer 24, and the separator 26 may further comprise the electrolyte 30 capable of conducting lithium ions. The separator 26 operates as both an electrical insulator and a mechanical support, by being sandwiched the negative electrode layer 22 and the positive electrode layer 24 to prevent physical contact and thus, the occurrence of a short circuit. The separator 26, in addition to providing a physical barrier between the electrodes 22, 24 can provide a minimal resistance path for internal passage of lithium ions (and related anions) for facilitating functioning of the battery 20. The separator 26 also contains the electrolyte solution in a network of open pores during the cycling of lithium ions, to facilitate functioning of the battery 20.

The battery 20 can generate an electric current during discharge by way of reversible electrochemical reactions that occur when the external circuit 40 is closed (to connect the negative electrode layer 22 and the positive electrode layer 24) when the negative electrode layer 22 contains a relatively greater quantity of inserted lithium. The chemical potential difference between the positive electrode layer 24 and the negative electrode layer 22 drives electrons produced by the oxidation of inserted lithium at the negative electrode layer 22 through the external circuit 40 toward the positive electrode layer 24. Lithium ions, which are also produced at the negative electrode, are concurrently transferred through the electrolyte 30 and separator 26 towards the positive electrode layer 24. The electrons flow through the external circuit 40 and the lithium ions migrate across the separator 26 in the electrolyte 30 to form intercalated lithium at the positive electrode layer 24. The electric current passing through the external circuit 40 can be harnessed and directed through the load device 42 until the inserted lithium in the negative electrode layer 22 is depleted and the capacity of the lithium ion battery 20 is diminished.

The lithium ion battery 20 can be charged or re-powered/re-energized at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode layer 24 to produce electrons and lithium ions. The electrons, which flow back towards the negative electrode layer 22 through the external circuit 40, and the lithium ions, which are carried by the electrolyte 30 across the separator 26 back towards the negative electrode layer 22, reunite at the negative electrode layer 22 and replenish it with inserted lithium for consumption during the next battery discharge event. As such, a complete discharging event followed by a complete charging event is considered to be a cycle, where lithium ions are cycled between the positive electrode layer 24 and the negative electrode layer 22. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator.

In many battery configurations, each of the negative current collector 32, negative electrode layer 22, the separator 26, positive electrode layer 24, and positive current collector 34 are prepared as relatively thin layers (for example, several microns or a millimeter or less in thickness) and assembled in layers connected in electrical parallel arrangement to provide a suitable energy package. The negative electrode current collector 32 and positive electrode current collector 34 respectively collect and move free electrons to and from an external circuit 40.

Furthermore, the battery 20 can include a variety of other components that while not depicted here are nonetheless known to those of skill in the art. For instance, the lithium ion battery 20 may include a casing, gaskets, terminal caps, tabs, battery terminals, and any other conventional components or materials that may be situated within the battery 20, including between or around the negative electrode layer 22, the positive electrode layer 24, and/or the separator 26, by way of non-limiting example. The battery 20 shown in FIG. 3 includes a liquid electrolyte 30 and shows representative concepts of battery operation.

As noted above, the size and shape of the lithium ion battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output and power density if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the battery 20 for purposes of storing energy.

The present technology pertains to improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

A. Positive Electrode Layer

The positive electrode layer 24 may be formed from a first electroactive material that can sufficiently undergo lithium intercalation and deintercalation while functioning as the positive terminal of the lithium ion battery 20. It is contemplated herein that the first electroactive material may be in particle form and may have a round geometry or an axial geometry as described herein. The positive electrode 24 may also include a polymeric binder material to structurally fortify the lithium-based active material and an electrically conductive material. One exemplary common class of known materials that can be used to form the positive electrode 24 is layered lithium transitional metal oxides. For example, in certain embodiments, the positive electrode layer 24 may comprise $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; LiFePO$_4$, LiMn$_{2-x}$Fe$_x$PO$_4$, where 0<x<0.3; LiNiCoAlO$_2$; LiMPO$_4$, where M is at least one of Fe, Ni, Co, and Mn; Li(Ni$_x$Mn$_y$Co$_z$Al$_p$)O$_2$, where 0≤x≤1, 0≤y≤1, 0≤z≤1, 0≤P≤1, x+y+z+p=1 (NCMA); LiNiMnCoO$_2$; Li$_2$Fe$_x$M$_{1-x}$PO$_4$ (M=Mn and/or Ni, 0≤x≤1); LiMn$_2$O$_4$; LiFeSiO$_4$; LiNi$_{0.6}$Mn$_{0.2}$Co$_{0.2}$O$_2$ (NMC622), LiMnO$_2$ (LMO), activated carbon, sulfur (e.g., greater than 60 wt % based on total weight of the positive electrode), or combinations thereof. Additionally or alternatively, the positive electrode layer 24 may include the functional electrode particles as described herein comprising the first electroactive material and Li$_3$PO$_4$.

Additionally or alternatively, the positive electrode layer 24 can optionally include an electrically conductive material and/or a polymeric binder as described herein. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel or iron), liquid metals (e.g., Ga, GaInSn), a conductive polymer (e.g., include polyaniline, polythiophene, polyacetylene, polypyrrole, and the like) and combinations thereof. As used herein, the term "graphene nanoplatelet" refers to a nanoplate or stack of graphene layers. Such electrically conductive material in particle form may have a round geometry or an axial geometry as described above.

Examples of suitable polymeric binders, include but are not limited to, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, lithium alginate, and combinations thereof. In some embodiments, the polymeric binder may be a non-aqueous solvent-based polymer or an aqueous-based polymer. In particular, the polymeric binder may be a non-aqueous solvent-based polymer that can demonstrate less capacity fade, provide a more robust mechanical network and improved mechanical properties to handle silicon particle expansion more effectively, and possess good chemical and thermal resistance. For example, the polymeric binder may include polyimide, polyamide, polyacrylonitrile, polyacrylic acid, a salt (e.g., potassium, sodium, lithium) of polyacrylic acid, polyacrylamide, polyvinyl alcohol, carboxymethyl cellulose, or a combination thereof. The first electroactive material may be intermingled with the electrically conductive material and/or at least one polymeric binder. For example, the first electroactive material and optional electrically conducting materials may be slurry cast with such binders and applied to a current collector. Polymeric binder can fulfill multiple roles in an electrode, including: (i) enabling the electronic and ionic conductivities of the composite electrode, (ii) providing the electrode integrity, e.g., the integrity of the electrode and its components, as well as its adhesion with the current collector, and (iii) participating in the formation of solid electrolyte interphase (SEI), which plays an important role as the kinetics of lithium intercalation is predominantly determined by the SEI.

In any embodiment, the first electroactive material may be present in the positive electrode in an amount, based on total weight of the positive electrode, of greater than or equal to about 50 wt. %, greater than or equal to about 60 wt. %, greater than or equal to about 70 wt. %, greater than or equal to about 80 wt. %, greater than or equal to about 90 wt. %, greater than or equal to about 95 wt. %, or about 99 wt. %; or from about 50 wt. % to about 99 wt. %, about 70 wt. % to about 99 wt. %, or about 90 wt. % to about 99 wt. %.

Additionally or alternatively, the electrically conductive material and the polymeric binder each may be independently present in the positive electrode in an amount, based on total weight of the positive electrode from about 0.5 wt. % to about 20 wt. %, about 1 wt. % to about 15 wt. %, or about 1 wt. % to about 10 wt. %.

B. Negative Electrode Layer

The negative electrode layer 22 includes a second electroactive material as a lithium host material capable of functioning as a negative terminal of a lithium ion battery. The second electroactive material may comprise, lithium (e.g., metallic lithium), a lithium alloy, such as, but not limited to, lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, and combinations thereof, for example, silicon mixed with graphite, and combinations thereof. Non-limiting examples of silicon-containing electroactive materials include silicon (amorphous or crystalline), or silicon containing binary and ternary alloys, such as Si—Sn, SiSnFe, SiSnAl, SiFeCo, and the like. In other variations, the negative electrode layer 22 may be a metal film or foil, such as a lithium metal film or lithium-containing foil. The second electroactive material may be in particle form and may have a round geometry or an axial geometry as described above. Additionally or alternatively, the negative electrode layer 22 may include the functional electrode particles as described herein comprising the second electroactive material and Li$_3$PO$_4$.

Additionally, the negative electrode layer 22 can optionally include an electrically conductive material as described herein and/or a polymeric binder as described herein that improves the structural integrity of the electrode. For example, the second electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, or lithium alginate, and applied to a current collector. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel or iron), liquid metals (e.g., Ga, GaInSn), a conductive polymer (e.g., include polyaniline, polythiophene, polyacetylene, polypyrrole, and the like) and combinations thereof.

In various aspects, the second electroactive material may be present in the negative electrode in an amount, based on total weight of the negative electrode from about 70 wt. % to about 99 wt. %, about 80 wt. % to about 98 wt. %, about 90 wt. % to about 99 wt. %, or about 95 wt. % to about 98 wt. %. Additionally or alternatively, the electrically conductive material and the polymeric binder each may be independently present in the negative electrode in an amount, based on total weight of the negative electrode from about 0.5 wt. % to about 15 wt. %, about 1 wt. % to about 10 wt. %, or about 1 wt. % to about 5 wt. %.

C. Currently Collectors

The first current collector 32 and the second current collector 34 may each comprise a metal comprising copper, aluminum, nickel, or alloys thereof, stainless steel, or other appropriate electrically conductive materials known to those of skill in the art. Additionally or alternatively, the first current collector 32 and the second current collector 34 may each be formed of or further include a carbon or a carbon and metal (e.g., silver (Ag), aluminum (Al), zinc (Zn)) composite coating layer, for example, having a thickness of about 500 nm to about 2 µm. In certain aspects, the first current collector 32 and/or the second current collector 34 may be in the form of a foil, slit mesh, and/or woven mesh.

D. Porous Separator

In any embodiment, the porous separator 26 may comprise any organic or inorganic material that can physically separate and electrically insulate a positive and negative electrode from each other while permitting the free flow of lithium ions therebetween. For example, the porous separator 26 may comprise composite material or a nonwoven material, e.g., a manufactured sheet, web, or matt of directionally or randomly oriented fibers, including but not limited to cotton, nylon, polyesters, glass and a combination thereof. As another example, the separator 26 may comprise a porous (e.g., microporous) polymeric material, e.g., a microporous polyolefin-based membrane or film. The porous separator 26 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly (vinyl chloride) (PVC). The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In some embodiments, the porous separator 26 may comprise a laminate of one or more polymeric materials, such as a laminate of PE and PP. Commercially available polyolefin porous separator substrates can include CELGARD® 2500 (a monolayer polypropylene separator) and CELGARD® 2325 (a trilayer polypropylene/polyethylene/polypropylene separator) available from Celgard LLC. Additionally or alternatively, the porous separator 26 may include the lithium ion-exchanged zeolite particles as described herein, for example, as a filler.

In other aspects, the porous separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the porous separator 26. The porous separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the porous separator 26 as a fibrous layer to help provide the porous separator 26 with appropriate structural and porosity characteristics. The porous separator 26 may have a thickness, in the range of about 4 µm to about 25 µm.

Additionally or alternatively, the separator 26 may include the functional lithium ion-exchanged zeolite particles as described herein as a filler within the separator 26.

E. Coating Layer(s)

Figure 4:
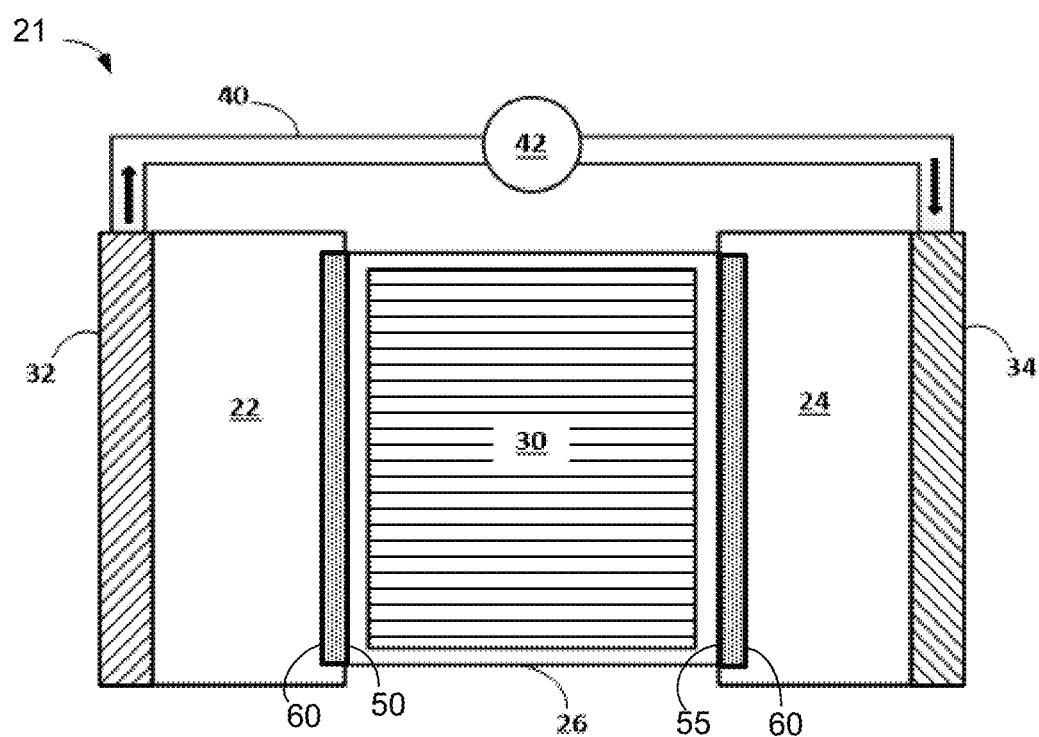
FIG. 4 is a schematic of another exemplary electrochemical battery according to the present disclosure.

In any embodiment, the porous separator may include a coating layer comprising the functional lithium ion-exchanged zeolite particles as described herein. For example, as shown in FIG. 4, in battery 21, the porous separator 26 may have a first side 50 and an opposing second side 55. The coating layer 60 that includes the functional lithium ion-exchanged zeolite particles may be present on one or both sides 50, 55 of the separator 26. In some embodiments, as shown in FIG. 4, the first side 50 and the second side 55 of the separator 26 may be coated with the coating layer 60. In assembly, the coating layer 60 present on first side 50 faces toward and presses against the negative electrode layer 22, and the coating layer 60 present on second side 55 faces toward and presses against the positive electrode layer 24. However, in other embodiments, the first side 50 of the separator 26 may be coated with the coating layer 60 and the second side 55 of the separator 26 may be uncoated such that, in assembly, the second side 55 of the separator 26 faces toward and presses against the positive electrode layer 24. In other embodiments, the second side 55 of the separator 26 may be coated with the coating layer 60 and the first side 50 of the separator 26 may be uncoated such that, in assembly, the first side 50 of the separator 26 faces toward and presses against the negative electrode layer 22. The coating layer 60 may additionally include a polymeric binder material as described herein.

The coating layer 60 may be continuously or discontinuously formed on the first and/or second sides 50, 55 of the separator 26. For example, the coating layer 60 may be formed on the first side 50 of the separator 26 such that the coating layer 60 covers an entire surface area or only a portion of the surface area on the first side 50 of the separator 26. Likewise, the coating layer 60 may be formed on the second side 55 of the separator 26 such that the coating layer 60 covers an entire surface area or only a portion of the surface area on the second side 55 of the separator 26. The coating layer 60 may extend over the first and second sides 50, 55 of the separator 26 and, in some instances, may extend partway into the micropores of the separator 26.

In any embodiment, the coating layer 60 may have thicknesses of less than or equal to about 25 µm, less than or equal to about 20 µm, less than or equal to about 10 µm, less than or equal to about 5 µm, less than or equal to about 1 µm, or about 50 nm. Additionally or alternatively, the coating layer 60 a may have thicknesses in the range of about 50 nm to about 20 µm, about 50 nm to about 10 µm, or about 50 nm to about 5 µm. As compared to the thickness of the separator 26, the thickness of the coating layer 60 may be less than that of the separator 26. For example, the thickness of the coating layer 60 may be 50% or less than the thickness of the separator 26.

The functional particles within the negative electrode layer 22, the positive electrode layer 24, the coating layer 60, and/or as a filler in separator 26, may be positioned within a lithium ion transport path through the electrochemical cells 20, 21. During operation of the electrochemical cells 20, 21 lithium ions can be communicated back and forth between the negative electrode 22 and the positive electrode 24 of the electrochemical cells 20, 21 and the functional particles may be positioned such that, during this back and forth movement, the lithium ions necessarily encounter one or more of the functional particles. The lithium ions may come into contact with or travel around or through the functional particles during their movement through the electrochemical cells 20, 21. The functional particles are formulated or selected, to adsorb, scavenge, entrap or otherwise inhibit the movement of certain target compounds within the electrochemical cells 20, 21, without adversely affecting the transport or net flow of lithium ions through the electrochemical cells 20, 21. For example, the particles of the functional lithium ion-exchanged zeolite particles may be formulated or selected based on the above-described pore size diameter, average particle size diameter, and/or cation content, to entrap or inhibit the movement of water molecules, polysulfide molecules, hydrogen ions, HF, and transition metal ions, such as $Mn^{2+}$ and $Fe^{2+/3+}$ ions, within the electrochemical cells 20, 21. The target compounds may be entrapped within the functional particles either physically, chemically, or both physically and chemically.

As such, including the functional particles within the cells 20, 21 can help prevent a phenomenon referred to as "voltage droop," reduce capacity fade and impedance, improve Coulombic efficiency, help maintain uniform current distribution along the electrode/electrolyte interface, reduce corrosion, and prevent outgassing of the cells 20, 21.

Without intending to be bound by theory, it is believed that the functional particles may advantageously help improve the cycle performance of the electrochemical cells 20, 21, for example, by trapping trace water, scavenging hydrofluoric acid (HF), and/or blocking polysulfide migration. Immobilizing trace water molecules within the electrochemical cells 20, 21 may help prevent decomposition of the liquid electrolyte 30, which in turn may help prevent decomposition of the lithium-based intercalation host material of the positive electrode 24. Hydrofluoric acid is highly corrosive and may be generated in the electrochemical cells, 20, 21 during decomposition of the electrolyte, in particular, by reaction of $LiPF_6$ with water according to the following reaction equation (2):

$$LiPF_6 + H_2O \leftrightarrow LiF + POF_3 + 2HF \quad (2)$$

The as-produced HF may increase the acidity of the liquid electrolyte 30, which may lead to corrosion of the lithium-based intercalation host material of the positive electrode layer 24 and/or the current collectors 32, 34. Therefore, by functioning as an HF scavenger, the functional particles in the cells, 20, 21 may reduce corrosion and degradation of the various components of the cells, 20, 21.

Furthermore, it is believed that the functional particles in the cells, 20, 21 may help improve the cycle performance of the electrochemical cells, 20, 21 by trapping transition metal ions, such as $Mn^{2+}$ and $Fe^{2+/3+}$ ions, which may be present in the liquid electrolyte 30 due to decomposition of the lithium-based intercalation host material of the positive electrode layer 24 and/or due to the presence of transition metal impurities in the positive electrode layer 24. Also, the functional particles within the cells, 20, 21 may help improve the robustness of the cells, 20, 21, for example, by improving the mechanical properties and thermal stability of the separator 26.

F. Electrolyte

The positive electrode layer 24, the negative electrode layer 22, and the separator 26 may each include an electrolyte solution or system 30 inside their pores, capable of conducting lithium ions between the negative electrode layer 22 and the positive electrode layer 24. Any appropriate electrolyte 30, whether in solid, liquid, or gel form, capable of conducting lithium ions between the negative electrode 22 and the positive electrode layer 24 may be used in the lithium-ion batteries 20, 21. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion batteries 20, 21.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), lithium (triethylene glycol dimethyl ether)bis(trifluoromethanesulfonyl)imide ($Li(G_3)$ (TFSI), lithium bis(trifluoromethanesulfonyl)azanide (LiTFSA), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane). One or more salts can be present in the electrolyte in a concentration (moles of salt per liter of solvent) ranging from greater than or equal to about 1 M, greater than or equal to about 2 M, greater than or equal to about 3 M, or about 4M, or from about 1 M to about 4 M, about 1 M to 2 M, about 2 M to about 4 M, or about 3 M to about 4 M.

Additionally or alternatively, the electrolyte may include additives, which can, for example, increase temperature and voltage stability of the electrochemical cell materials (e.g., electrolyte 30, negative electrode layer 22, and positive electrode layer 24). Examples of suitable additives include, but are not limited to, vinyl carbonate, vinyl-ethylene carbonate, propane sulfonate, and combinations therefore. Other additives can include diluents which do not coordinate with lithium ions but can reduce viscosity, such as bis(2,2, 2-trifluoroethyl) ether (BTFE), and flame retardants, such as triethyl phosphate.

EXAMPLES

Example 1

Figure 5:
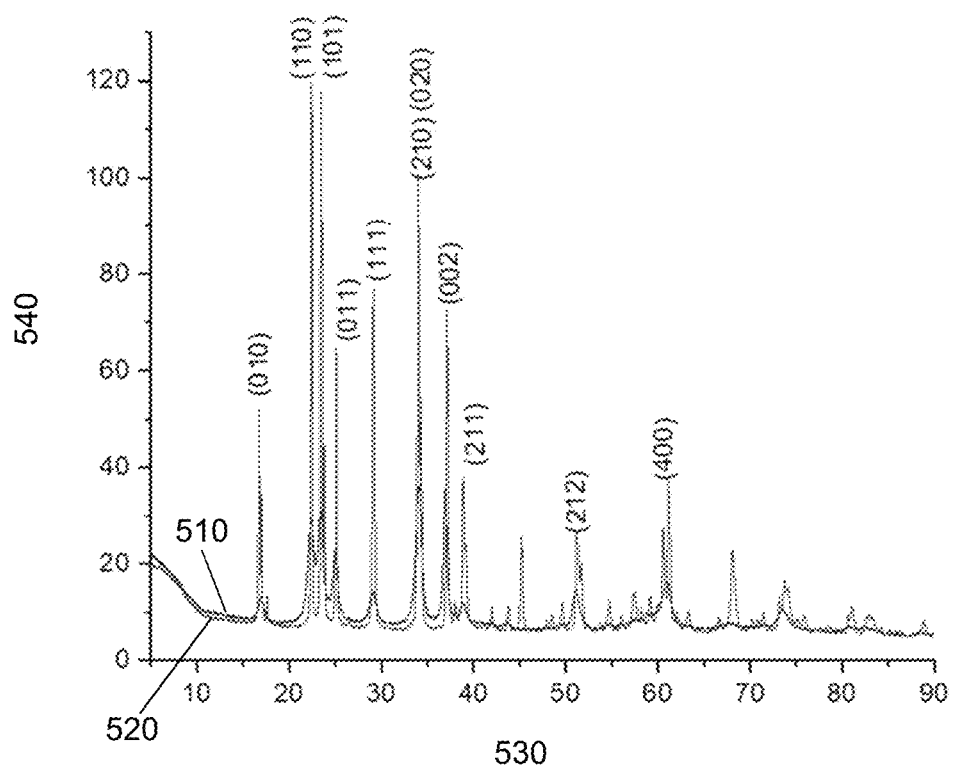
FIG. 5 is an X-ray diffraction (XRD) graph for $Li_3PO_4$ particles formed according to Example 1.
Figure 6A:
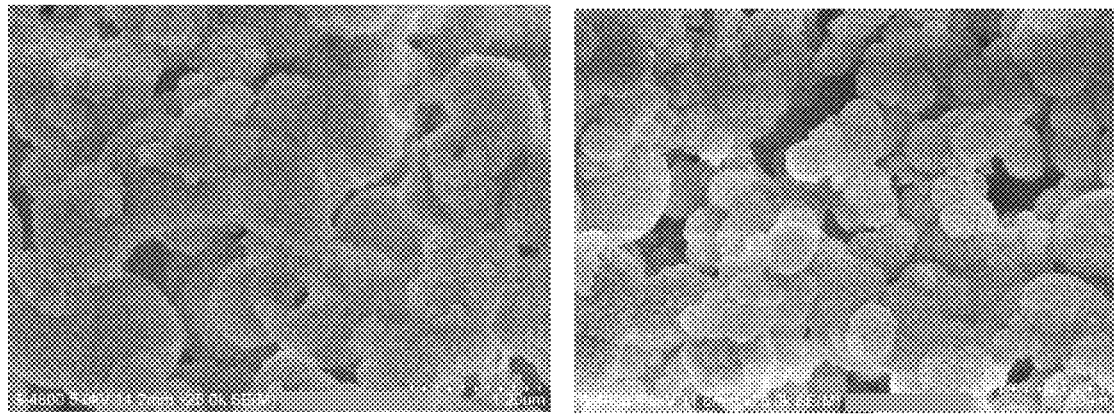
FIGS. 6A and 6B are scanning electron microscope (SEM) images of $Li_3PO_4$ particles formed according to Example 1.
Figure 6B:
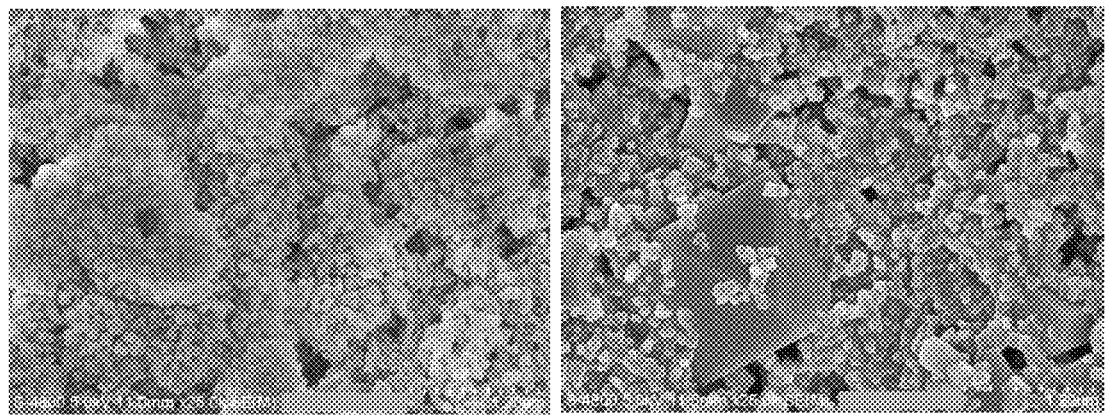

$Li_3PO_4$ particles were synthesized by dissolving $(NH_4)_3PO_4$ in distilled water at room temperature (25° C.) to make 1 M solution in one container. Then LiOH was mixed into distilled water at room temperature (25° C.) to make a 3M solution. The same volumes of the two solutions were used and $(NH_4)_3PO_4$ was gradually added into the LiOH solution to form $Li_3PO_4$ and LiOH was gradually added into the $(NH_4)_3PO_4$ solution to form $Li_3PO_4$. The $Li_3PO_4$ powders for each instance were precipitated out at the bottom of the container. The mixed solution was centrifuged to remove excess water. The $Li_3PO_4$ powder was dried at 80° C. for 8 hrs, then calcined at 400° C. for 4 hrs. The dry $Li_3PO_4$ powder was collected for XRD and SEM analysis. FIG. 5 shows the XRD graph for the $Li_3PO_4$ particles (510) formed adding LiOH to $(NH_4)_3PO_4$ and $Li_3PO_4$ particles (520) formed adding $(NH_4)_3PO_4$ to LiOH. In FIG. 5, the x-axis (530) corresponds to the 2θ value and the y-axis (540) corresponds to intensity. FIG. 6A shows the SEM images for the $Li_3PO_4$ particles formed adding LiOH to $(NH_4)_3PO_4$ showing the formation of hollow spheres. FIG. 6B shows the SEM images for the $Li_3PO_4$ particles formed adding $(NH_4)_3PO_4$ to LiOH.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing functional lithium exchanged zeolite particles for an electrochemical cell, the method comprising:
   (a) combining a solution comprising $(NH_4)_3PO_4$ with lithium ion-exchanged zeolite particles to form a first mixture; and
   (b) adding a polymeric binder and a lithium salt to the first mixture to form a first slurry comprising the functional lithium ion-exchanged zeolite particles comprising $Li_3PO_4$.

2. The method of claim 1, wherein the functional lithium ion-exchanged zeolite particles comprise cages defined by 8-membered rings, 9-membered rings, 10-membered rings, 12-membered rings or a combination thereof and wherein the cages contain the $Li_3PO_4$.

3. The method of claim 1, wherein the functional lithium ion-exchanged zeolite particles comprise a zeolite material having a framework type selected from the group consisting of NAT, EDI, THO, ANA, YUG, GOO, MON, HEU, STI, BRE, FAU, MFI, LTL, LTA, and a combination thereof.

4. The method of claim 1, wherein the functional lithium ion-exchanged zeolite particles comprise a zeolite material selected from the group consisting of zeolite A, zeolite Y, zeolite L, ZSM-5, and a combination thereof.

5. The method of claim 1, wherein the lithium salt is selected from the group consisting of lithium hydroxide, lithium carbonate, lithium chloride, lithium nitrate, lithium sulfate, and a combination thereof.

6. The method of claim 1, wherein the concentration of each of the $(NH_4)_3PO_4$ and the lithium salt is about 0.01 M to about 1 M.

7. The method of claim 1, further comprising one or more of:
   (c1) applying the first slurry onto a first side of a porous separator, a second side of the porous separator, or both the first and second sides of the porous separator and solidifying the first slurry to form a coating layer comprising the functional lithium ion-exchanged zeolite particles, wherein the coating layer is present on the first side of the porous separator, the second side of the porous separator, or both the first and second sides of the porous separator; and
   (c2) incorporating the first slurry with the porous separator and solidifying the first slurry to form a filler comprising the functional lithium ion-exchanged zeolite particles within the porous separator.

8. A method of preparing functional electrode particles for an electrochemical cell, the method comprising:
   (a) combining a solution comprising $(NH_4)_3PO_4$ with a polymeric binder to form a second mixture;
   (b) adding electroactive particles to the second mixture; and
   (c) adding a lithium salt to the second mixture to form a second slurry comprising functional electrode particles, wherein the functional electrode particles comprise the electroactive particles and $Li_3PO_4$.

9. The method of claim 8, wherein the lithium salt is selected from the group consisting of lithium hydroxide, lithium carbonate, lithium chloride, lithium nitrate, lithium sulfate, and a combination thereof.

10. The method of claim 8, wherein the concentration of each of the $(NH_4)_3PO_4$ and the lithium salt is about 0.01 M to about 1 M.

11. The method of claim 8, wherein the electroactive particles comprise $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2Fe_xM_{1-x}PO_4$, where M is Mn and/or Ni, $0 \leq x \leq 1$; $LiMn_2O_4$; $LiFeSiO_4$; $LiNi_{0.6}Mn_{0.2}Co_{0.2}O_2$ (NMC622), $LiMnO_2$ (LMO) activated carbon, sulfur, lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

12. The method of claim 8, further comprising:
   (d) applying the second slurry onto a third surface of a current collector; and
   (e) solidifying the second slurry to form an electrode layer comprising the functional electrode particles.

13. An electrochemical cell comprising:
   a positive electrode layer comprising a first electroactive material;
   a negative electrode layer spaced apart from the positive electrode layer, wherein the negative electrode layer comprises a second electroactive material;
   a porous separator disposed between confronting surfaces of the negative electrode layer and the positive electrode layer;
   a liquid electrolyte infiltrating one or more of the negative electrode layer, the positive electrode layer, and the porous separator layer;
   functional lithium ion-exchanged zeolite particles comprising $Li_3PO_4$, wherein the functional lithium ion-exchanged zeolite particles comprise cages defined by 8-membered rings, 9-membered rings, 10-membered rings, 12-membered rings or a combination thereof and wherein the cages contain the $Li_3PO_4$; and optionally, functional electrode particles comprising: (a) $Li_3PO_4$ and the first electroactive material; and/or (b) $Li_3PO_4$ and the second electroactive material.

14. The electrochemical cell of claim 13, wherein the functional lithium ion-exchanged zeolite particles are present as one or more of the following:
   (i) a coating layer present on a first side, a second side or both the first and second sides of the porous separator; and
   (ii) a filler in the porous separator.

15. The electrochemical cell of claim 13, wherein the functional lithium ion-exchanged zeolite particles comprise a zeolite material having a framework type selected from the group consisting of NAT, EDI, THO, ANA, YUG, GOO, MON, HEU, STI, BRE, FAU, MFI, LTL, LTA, and a combination thereof.

16. The electrochemical cell of claim 13, wherein the functional lithium ion-exchanged zeolite particles comprise a zeolite material selected from the group consisting of zeolite A, zeolite Y, zeolite L, ZSM-5, and a combination thereof.

17. The electrochemical cell of claim 13, wherein, when present the functional electrode particles are present in one or more of the following:
   (i) the positive electrode layer; and
   (ii) the negative electrode layer.

18. The electrochemical cell of claim 13, wherein the first electroactive material is selected from the group consisting of $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P < 1$, $x+y+z+p=1$ (NCMA); LiNiMnCoO$_2$; $Li_2Fe_xM_{1-x}PO_4$, where M is Mn and/or Ni, $0 \leq x \leq 1$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

19. The electrochemical cell of claim 13, wherein the second electroactive material comprises lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

* * * * *